United States Patent
Sitter, Jr.

(10) Patent No.: US 11,567,309 B2
(45) Date of Patent: Jan. 31, 2023

(54) ON-AXIS FOUR MIRROR ANASTIGMAT TELESCOPE

(71) Applicant: RAYTHEON COMPANY, Waltham, MA (US)

(72) Inventor: David N. Sitter, Jr., Torrance, CA (US)

(73) Assignee: RAYTHEON COMPANY, Waltham, MA (US)

(*) Notice: Subject to any disclaimer, the term of this patent is extended or adjusted under 35 U.S.C. 154(b) by 259 days.

(21) Appl. No.: 16/869,206

(22) Filed: May 7, 2020

(65) Prior Publication Data

US 2021/0026128 A1    Jan. 28, 2021

Related U.S. Application Data

(60) Provisional application No. 62/878,554, filed on Jul. 25, 2019.

(51) Int. Cl.
*G02B 23/00* (2006.01)
*G02B 23/02* (2006.01)
(Continued)

(52) U.S. Cl.
CPC ......... *G02B 23/02* (2013.01); *G02B 17/0652* (2013.01); *G02B 17/084* (2013.01)

(58) Field of Classification Search
CPC ...... G02B 23/02; G02B 17/084; G02B 23/00; G02B 23/06; G02B 23/2484; G02B 17/00; G02B 17/0647; G02B 17/0652; G02B 23/14; G02B 23/18; G02B 23/24; G02B 17/002; G02B 17/008; G02B 17/02;
(Continued)

(56) References Cited

U.S. PATENT DOCUMENTS 3,455,623 A    7/1969   Harris
3,782,835 A    1/1974   Abel
(Continued)

FOREIGN PATENT DOCUMENTS

EP    3118663 A1    1/2017
GB    2339923 A     2/2000
(Continued)

OTHER PUBLICATIONS

International Search Report and Written Opinion of International Application No. PCT/US2020/043250 dated Oct. 20, 2020.

*Primary Examiner* — Thong Q Nguyen
(74) *Attorney, Agent, or Firm* — Lando & Anastasi, LLP

(57) ABSTRACT

An on-axis four mirror anastigmat telescope includes an entrance pupil configured to receive light from an image, and a mirror assembly. The mirror assembly has a first reflective surface having a central aperture formed therein, a second reflective surface, a third reflective surface having a central aperture formed therein, a fourth reflective surface, and an aperture stop. The mirror assembly is configured to receive light from the image on a common axis and to reflect the light successively by the four coaxial reflective surfaces through the aperture stop. The telescope further comprises a detector configured to receive light from the mirror assembly. The central aperture formed in the first reflective surface defines a field stop to limit the field of view.

11 Claims, 7 Drawing Sheets

(51) Int. Cl.
  *G02B 17/08* (2006.01)
  *G02B 17/06* (2006.01)
(58) Field of Classification Search
  CPC ................ G02B 17/023; G02B 17/026; G02B 17/0684; G02B 17/08; G02B 17/0836
  USPC ................ 359/362–367, 850–861, 399–430
  See application file for complete search history.

(56) References Cited

U.S. PATENT DOCUMENTS

| | | |
|---|---|---|
| 3,790,258 A | 2/1974 | Rambauske |
| 3,802,767 A | 4/1974 | Rambauske |
| 3,827,778 A | 8/1974 | Wheeler |
| 3,982,824 A | 9/1976 | Rambauske |
| 4,272,152 A | 6/1981 | Shafer |
| 4,685,777 A | 8/1987 | Hirose |
| 4,701,035 A | 10/1987 | Hirose |
| 4,812,030 A | 3/1989 | Pinson |
| 5,323,263 A | 6/1994 | Schoenmakers |
| 5,386,316 A * | 1/1995 | Cook ................ G02B 17/0663 359/857 |
| 5,515,207 A | 5/1996 | Foo |
| 2009/0303617 A1* | 12/2009 | Chang ................ G02B 5/005 29/432 |

FOREIGN PATENT DOCUMENTS

| | | | |
|---|---|---|---|
| JP | 2004-198508 | * | 7/2004 |
| WO | 2006015273 A2 | | 2/2006 |

* cited by examiner $$A \begin{bmatrix} 0.5669 & 0 & 0 & 0 \\ -0.00031 & 0.56531 & 0 & 0 \\ 0 & 0 & 0.5654 & -0.000937 \\ 0 & 0 & 0 & 0.5641 \end{bmatrix}$$

$$B \begin{bmatrix} 0.5669 & 0.0004 & 0 & 0.0001 \\ 0.000146 & 0.565154 & 0 & -0.009766 \\ 0.00323 & -0.00323 & 0.56197 & 0.00044 \\ 0.000063 & -0.000063 & -0.0013825 & 0.563837 \end{bmatrix}$$

ON-AXIS FOUR MIRROR ANASTIGMAT TELESCOPE

CROSS-REFERENCE TO RELATED APPLICATION

This application claims the benefit under 35 U.S.C. § 119(e) of U.S. Provisional Patent Application No. 62/878,554 titled ON-AXIS FOUR MIRROR ANASTIGMAT TELESCOPE filed on Jul. 25, 2019, which is herein incorporated by reference in its entirety for all purposes.

GOVERNMENT RIGHTS

Not applicable.

BACKGROUND OF THE INVENTION

This invention relates generally to optical systems and, more particularly, to an on-axis four mirror anastigmat telescope with enhanced stray light suppression.

There are off-axis reflective anastigmat telescope designs which offer excellent imaging performance while minimizing stray light issues. An example of such an off-axis anastigmat telescope design is generally indicated at 2 in FIG. 1. However, off-axis geometry does not fit well within a tight cylindrical volume. In addition, off-axis telescope designs generally have higher polarization sensitivity. There exist on-axis reflective anastigmatic telescopes; however, these designs are typically beset with significant stray light issues. Reference can be made to WO 2006/015273 as an example of an all-reflective telescope having a positive optical-power primary mirror, a negative optical-power secondary mirror, a positive optical-power tertiary mirror, a negative optical-power quaternary mirror, and a positive optical-power field lens. The mirrors and the lens of the telescope are axisymmetric about a beam axis. Reference can also be made to U.S. Pat. No. 3,455,623, which discloses a telescope having four spheroidal reflective surfaces that are axially aligned to form an anastigmat with light passing from a second to a third surface through central apertures in first and fourth surfaces.

SUMMARY OF INVENTION

One aspect of the present disclosure is directed to an on-axis four mirror anastigmat telescope. In one embodiment, the telescope comprises an entrance pupil configured to receive light from an image, and a mirror assembly. The mirror assembly has a first reflective surface having a central aperture formed therein, a second reflective surface, a third reflective surface, a fourth reflective surface having a central aperture formed therein, and an aperture stop. The mirror assembly is configured to receive light from the image on a common axis and to reflect the light successively by the four coaxial reflective surfaces through the aperture stop. The telescope further comprises a detector configured to receive light from the mirror assembly. The central aperture formed in the first reflective surface defines a field stop to limit the field of view.

Embodiments of the telescope further may include configuring the first reflective surface and the fourth reflective surface as concave annular surfaces, which are arranged back-to-back on the common axis. The first reflective surface and the fourth reflective surface may be formed on opposite faces of a common element. The central aperture of the first reflective surface and the central aperture of the fourth reflective surface may be formed by a physical opening in the common element. The second reflective surface and the third reflective surface may be convex surfaces arranged in coaxial relation facing respective concave surfaces. The aperture stop may be positioned position in object space adjacent to the third reflective surface. The aperture stop may embody a lens ring configured to limit brightness of an image. The aperture stop may be implemented with a structure supporting the third reflective surface. The entrance pupil may be located at the image of the aperture stop, and may have an aperture slightly larger than the image of the aperture stop. The entrance pupil may embody a Lyot stop. The telescope further may include a filter positioned between the mirror assembly and the detector. The telescope may have an effective focal length of 51.75 millimeters and a field of view of 3.58°, with a 30 millimeters aperture. The telescope may have an effective radiometric F/# of 2.65, and an effective central obscuration diameter of an on-axis ray bundle of approximately 22.77 millimeters. The telescope may have an effective focal length of 51.75 millimeters and a field of view of 3.58°, with a 29 millimeter aperture. The telescope may have an effective radiometric F/# of 2.60, and an effective central obscuration diameter of an on-axis ray bundle of approximately 21.09 millimeters. The entrance pupil and the field stop may be positioned and configured to enhance stray light suppression. Obscuration of the third reflective surface prevents the detector from seeing obscuration of the second reflective surface.

Another aspect of the present disclosure is directed to a method of reflecting light within a telescope configured to reduce stray light, the telescope having an entrance pupil, a first reflective surface, a second reflective surface, a third reflective surface, a fourth reflective surface, a fist central aperture formed in the first reflective surface, and a second central aperture formed in the fourth reflective surface. In one embodiment, the method comprises: directing light from the entrance pupil to the first reflective surface; reflecting light off of the first surface to the second reflective surface; reflecting light off of the second reflective surface through the first central aperture provided in the first reflective surface and the second central aperture provided in the fourth reflective surface to the third reflective surface; and reflecting light off of the third reflective surface to the fourth reflective surface to a detector. The first central aperture provided in the first reflective surface defines a field stop to limit the field of view.

Embodiments of the method further may include passing light through a filter prior to reaching the detector. The first reflective surface, the second reflective surface, the third reflective surface and the fourth reflective surface are configured to receive light from the image on a common axis and to reflect the light successively by the four coaxial reflective surfaces through an aperture stop.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence is intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION OF THE INVENTION

Certain applications with tight packaging constraints may necessitate a broad band anastigmatic telescope that is on-axis in design. For example, this situation occurs where the optical system must fit in tight cylindrical volume, such as a missile seeker or an endoscope. For high-performance infrared imaging applications, the imaging system also may be required to have a field stop and a relayed pupil to suppress stray light and to provide high cold stop efficiency. However, on-axis designs are often plagued with stray light paths ("sneak paths") that must be suppressed. Finally, an on-axis design may be desired to reduce polarization sensitivity. Embodiments of the present disclosure are directed to an on-axis four mirror anastigmat telescope that addresses meets these needs and has a high level of stray light suppression.

One significant difference to prior designs, e.g., the optical system disclosed in U.S. Pat. No. 3,455,623, is that a field stop is introduced at an intermediate image. Specifically, in one embodiment, the field stop is formed in a first reflective surface, rather than by a separate structure dedicated to supporting the field stop. In addition, an entrance pupil has been added at the conjugate image of the aperture stop or the cold stop. In one embodiment, the entrance pupil is a Lyot stop and provides significant stray light suppression. The telescope design is designed so that the obscuration of a secondary mirror is not seen by the detector. Instead, the obscuration of a tertiary mirror prevents the detector from seeing the obscuration of the secondary mirror. This results in an optical design with superior stray light suppression.

The telescope design is an on-axis, all-reflective, four mirror anastigmat. The on-axis design is further well-suited for packaging within a cylindrical volume. The design has a field stop and a relayed pupil for stray light suppression. In addition, the telescope is designed so that the central obscuration by the tertiary mirror prevents the detector from seeing the obscuration of the secondary mirror. It is observed that embodiments of the telescope design have superior stray light suppression and low polarization sensitivity.

Figure 1:
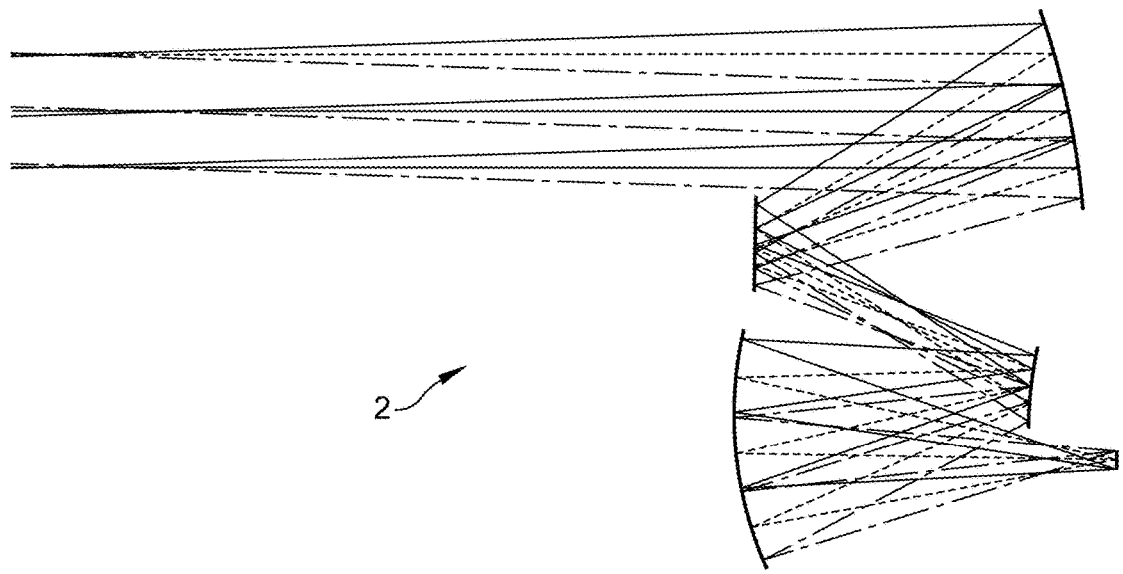
FIG. 1 is a schematic view of an off-axis reflective anastigmat telescope design of a known embodiment.
Figure 2:
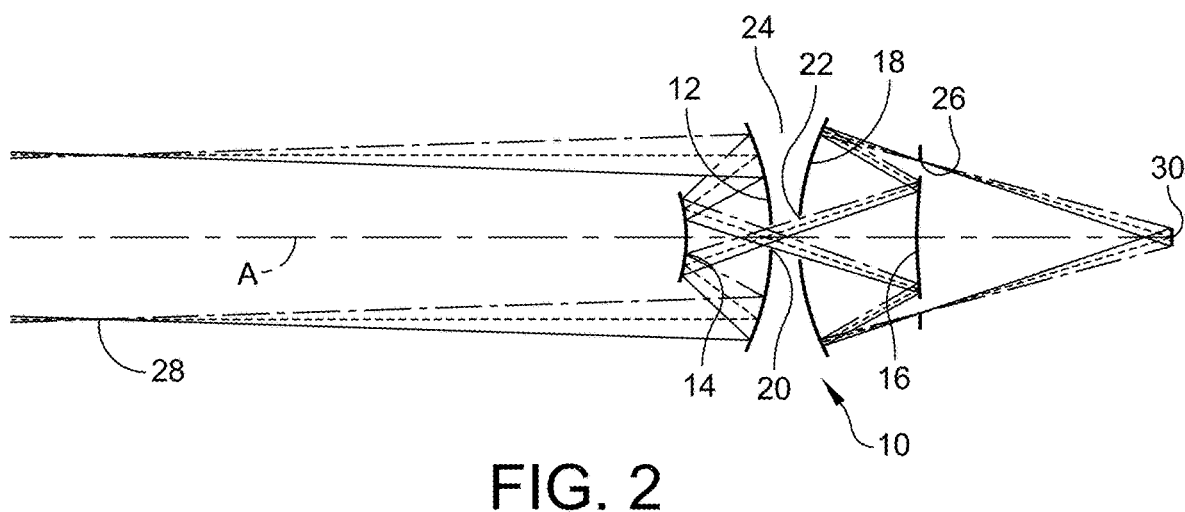
FIG. 2 is a schematic view of an on-axis four mirror anastigmat telescope design of an embodiment of the present disclosure.

Referring to the drawings, and more particularly to FIG. 2, an on-axis four mirror anastigmat telescope is schematically represented at 10. As shown, the telescope includes a mirror assembly consisting of four reflective surfaces or mirrors, first reflective surface 12, second reflective surface 14, third reflective surface 16 and fourth reflective surface 18. Incoming electromagnetic radiation, e.g., light, from a distant object on an axis A is reflected successively by the four coaxial spheroidal reflective surfaces 12, 14, 16 and 18. In one embodiment, the first reflective surface 12 and the fourth reflective surface 18 are concave annular surfaces with central light transmitting apertures 20, 22, respectively. Those reflective surfaces 12, 18 are arranged back to back on the axis A, and formed on opposite faces of a common element 24, for example. In another embodiment, the reflective surfaces 12, 18 can be formed on different elements. As shown, the surface apertures 20, 22 are formed by a physical opening formed in the common element 24. The aperture 20 formed in the first reflective surface 12 defines a field stop to limit the FOV. The second reflective surface 14 and the third reflective surface 16 are convex surfaces arranged in coaxial relation facing the respective concave surfaces 12, 18 along axis A. As shown in FIG. 2, incoming light that is parallel to the axis A and oblique light is reflected by the second reflective surface 14 through the apertures 20, 22 in the first and fourth reflective surfaces 12, 18, respectively, to the most rearward surface. An aperture stop 26 is further provided at a position in object space adjacent to the third reflective surface 16. In one embodiment, the aperture stop 26 is built into the structure supporting the reflective surface 16.

As shown, light from an image enters an entrance pupil 28 and is directed to the first reflective surface 12. In one embodiment, the entrance pupil 28 is located at the image of the aperture stop 26, which may be a cold stop for infrared applications, and has an aperture slightly larger than the image of the aperture stop. Light reflected off of the first surface 12 is directed to the second reflective surface 14, which in turn is directed through the first central aperture or field stop 20 provided in the first reflective surface 12. This light travels through a second central aperture 22 provided in the fourth reflective surface 18 to the third reflective surface 16. The light is then directed to the fourth reflective surface 18, which in turn is directed to a detector 30 that is configured to detect the image. This light may pass through a filter prior to reaching the detector 30. As mentioned above, the aperture stop 26 assists in directing this light to the detector 30.

In one embodiment, the aperture stop 26 embodies a lens ring that physically limits the solid angle of rays passing through the telescope from an on-axis object point. The aperture stop 26 limits brightness of an image. The entrance pupil 28 embodies an opening an observer would identify as the limitation on the solid angle of rays diverging from an on-axis object point.

It is observed that the optical powers of the mirror assembly creating reflective surfaces 12, 14, 16 and 18 are configured as positive-negative-negative-positive, while most existing designs are configured as positive-negative-positive-negative. There are two central obscurations created by the second reflective surface 14 and the third reflective surface 16; however, the telescope design can be optimized so that there is effectively only one obscuration caused by the third reflective surface 16. For cooled detectors, the design disclosed herein has a smaller cooled volume consisting of the region around the detector 30, the cold stop 26 and a cold central obscuration corresponding to the blockage of the tertiary reflective surface or mirror 16. In one embodiment, the central cold central obscuration is built into the cold stop 26. Moreover, the angular field of view (FOV) of the design disclosed herein is significantly larger than prior designs.

In one embodiment, the radii of curvature of the four reflective surfaces 12, 14, 16 and 18, or, if they are not spherical, their paraxial radii of curvature (the radii of their osculating spheres at the axis) and the mutual axial spacings of those surfaces are chosen that the incoming beams of parallel light indicated not only form main images in the principal focal surface of the system, but form approximate intermediate real images, in the intermediate focal surface between the second and third reflective surfaces 14, 16. The size of the apertures 20, 22 can be correspondingly small, especially if the angular field to be covered by the objective is not large.

In one embodiment, one or more of the first, second, third and fourth reflective surfaces 12, 14, 16 and 18 are non-spherical surfaces of revolution with respect to the axis A, the generating curves for such surfaces being designed in accordance with the known laws of optics to reduce or eliminate selected optical aberrations of the overall system, such as spherical aberration, coma, astigmatism, field curvature and distortion. Since the respective forms of all aspheric surfaces are selected entirely for optimizing the optical quality of the final image in whatever respects may be desired, the aberrations that would be present in the image with spherical surfaces are typically not reduced and may even be increased.

Figure 3:
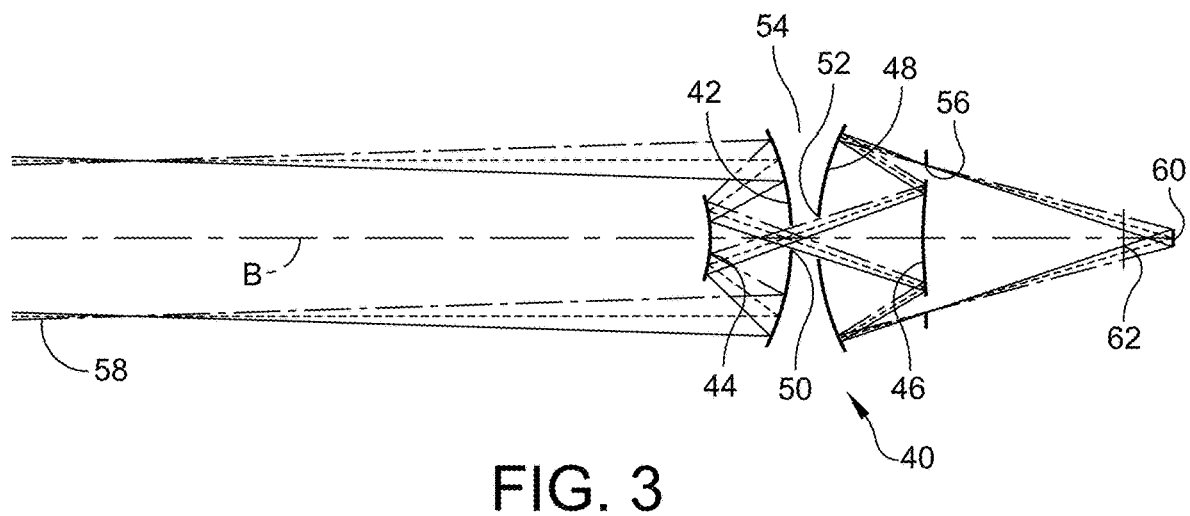
FIG. 3 is a schematic view of an on-axis four mirror anastigmat telescope design of another embodiment of the present disclosure.

Referring to FIG. 3, a high-resolution on-axis four mirror anastigmat telescope is schematically represented at 40. As shown, the telescope 40 is instructed similarly to telescope 10, and includes a mirror assembly consisting of four reflective surfaces, first reflective surface 42, second reflective surface 44, third reflective surface 46 and fourth reflective surface 48. Incoming light from a distant object on an axis B is reflected successively by the four coaxial spheroidal reflective surfaces 42, 44, 46 and 48. In one embodiment one or more of the reflective surfaces 42, 44, 46 and 48 are aspherical, which contributes to higher resolution.

The first reflective surface 42 and the fourth reflective surface 48 are concave annular surfaces with central light transmitting apertures 50, 52, respectively. Those reflective surfaces 42, 48 are arranged back to back on the axis B, and formed on opposite faces of a common element 54. The aperture 50 formed in the first reflective surface 42 defines a field stop to limit the FOV. The second reflective surface 44 and the third reflective surface 46 are convex surfaces arranged in coaxial relation facing the respective concave surfaces 42, 48 along axis B. An aperture stop 56 is further provided at a position in image space adjacent to the third reflective surface 46.

Light enters an entrance pupil 58 and is directed to the first reflective surface 42. In one embodiment, the entrance pupil 58 is a Lyot stop, which is configured to reduce the amount of flare caused by diffraction of other stops and elements in the telescope 40. Light reflected off of the first surface 42 is directed to the second reflective surface 44, which in turn is directed through the first central aperture 50 provided in the first reflective surface 42. The aperture 50 formed in the first reflective surface 42 defines a field stop to limit the FOV. This light travels through a second central aperture 52 provided in the fourth reflective surface 48 to the third reflective surface 46. The light is then directed to the fourth reflective surface 48, which in turn is directed to a detector 60 that is configured to detect the image. This light passes through a filter 62 prior to reaching the detector 60.

With high-resolution telescope 40, in one embodiment, the effective focal length (EFL) is 51.75 millimeters (mm) and the FOV is 3.58°, with a 30 mm aperture (with central obscuration). A third reflective surface and spider structure supporting the third reflective surface 46 double as the aperture stop 56 and block for central obscuration. The obscuration of the second reflective surface 44 lies in the shadow of the blocking, i.e., it is not seen. The effective radiometric F/#is 2.65, and the effective central obscuration diameter of the on-axis ray bundle is approximately 22.77 mm. In one embodiment, the high-resolution telescope optical parameters are as follows:

Effective focal length [mm]=51.75;
Diametric field of view [deg]=3.58;
Entrance pupil diameter [mm]=30;
Central obscuration diameter [mm]=22.77;
The light incident on the optical filter is within an angular cone
  Angle of incidence ranges from 10.8° to 18.6°;
Optical prescription is diffraction-limited at 475 nm and longer;
On-axis projected solid angle [ster]=0.11183 [Effective radiometric F/# (including central obs.)=2.650]; and
Off-axis projected solid angle [ster]=0.11164 [Effective radiometric F/# (including central obs.)=2.652].

Figure 4:
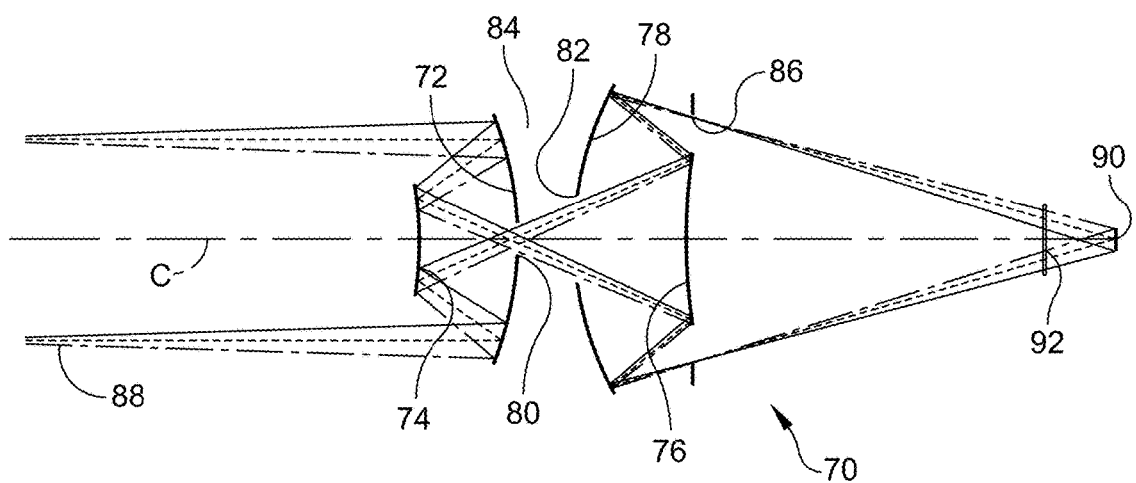
FIG. 4 is a schematic view of an on-axis four mirror anastigmat telescope design of another embodiment of the present disclosure.

Referring to FIG. 4, a lower-resolution on-axis four mirror anastigmat telescope is schematically represented at 70. Such a telescope 70 may be used for a scanned radiometer, which has large detectors and therefore high imaging resolution is not required. As shown, the telescope 70 is instructed similarly to telescopes 10 and 40, and includes a mirror assembly consisting of four reflective surfaces, first reflective surface 72, second reflective surface 74, third reflective surface 76, and fourth reflective surface 78. In this embodiment, the surfaces 72 74, 76 and 78 are spherical, and thus less expensive to manufacture. Incoming light from a distant object on an axis C is reflected successively by the four coaxial spheroidal reflective surfaces 72 74, 76 and 78.

The first reflective surface 72 and the fourth reflective surface 78 are concave annular surfaces with central light transmitting apertures 80, 82, respectively. Those reflective surfaces 72, 78 are arranged back to back on the axis C, and formed on opposite faces of a common element 84. The aperture 80 formed in the first reflective surface 72 defines a field stop to limit the FOV. The second reflective surface 74 and the third reflective surface 76 are convex surfaces arranged in coaxial relation facing the respective concave surfaces 72, 78 along axis C. An aperture stop 86 is further provided at a position in object space adjacent to the third reflective surface 46.

Light enters an entrance pupil 88 and is directed to the first reflective surface 72. Light reflected off of the first surface 72 is directed to the second reflective surface 74, which in turn is directed through the first central aperture 80 provided in the first reflective surface 72. The aperture 80 formed in the first reflective surface 72 defines a field stop to limit the FOV. This light travels through the second central aperture 82 provided in the fourth reflective surface 78 to the third reflective surface 76. The light is then directed to the fourth reflective surface 78, which in turn is directed to a detector 90 that is configured to detect the image. This light passes through a filter 92 prior to reaching the detector.

With the lower-resolution telescope 70, in one embodiment, the EFL is 51.75 mm and the FOV is 3.58°, with a 29 mm aperture (with central obscuration). A third reflective surface and spider structure supporting the third reflective surface 76 double as the aperture stop 86 and block for central obscuration. The obscuration of the second reflective surface 74 lies in the shadow of the blocking, i.e., it is not seen. The effective radiometric F/#is 2.60, and the effective central obscuration diameter of the on-axis ray bundle is approximately 21.09 mm. In one embodiment, the lower-resolution telescope optical parameters are as follows:

Effective focal length [mm]=51.75;
Diametric field of view [deg]=3.58;
Entrance pupil diameter [mm]=29;
Central obscuration diameter [mm]=21.09;
The light incident on the optical filter is within an angular cone
  Angle of incidence ranges from 10.2° to 17.6°;
On-axis projected solid angle [ster]=0.11626 [Effective radiometric F/# (including central obs.)=2.599]; and
Off-axis projected solid angle [ster]=0.11614 [Effective radiometric F/# (including central obs.)=2.600].

Figure 5:
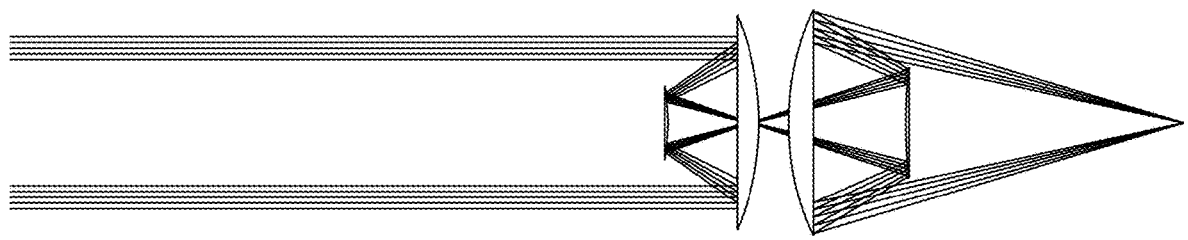
FIGS. 5 and 6 are schematic views of on-axis light generated through an on-axis four mirror anastigmat telescope design of an embodiment of the present disclosure and light within an annular aperture stop as seen by a detector, respectively.
Figure 6:
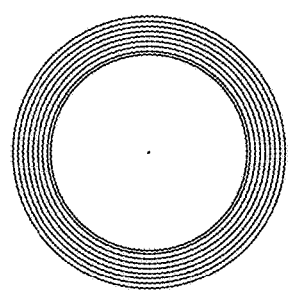
Figure 7:
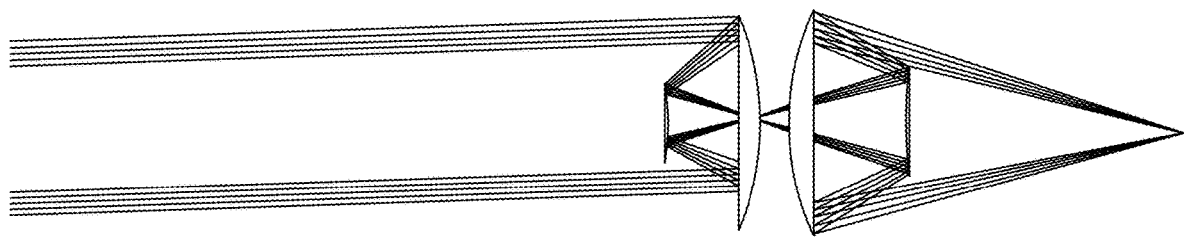
FIGS. 7 and 8 are schematic views of off-axis light generated through an on-axis four mirror anastigmat telescope design of an embodiment of the present disclosure and light within an annular aperture stop as seen by a detector, respectively.
Figure 8:
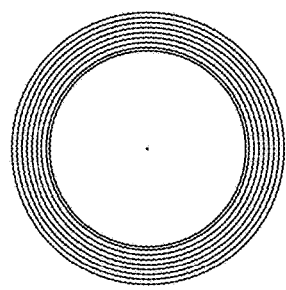

A feature of embodiments of the present disclosure is a choice of the spacing between the optical elements and the optical powers of the reflective surfaces such that the central obscuration of the second reflective surface is not seen by the detector since the second mirror falls within the shadow created by the third reflective surface. FIGS. 5 and 6 illustrate on-axis rays generated through an on-axis four mirror anastigmat telescope design. In FIG. 5, it is seen that the rays (light) that fill the annular aperture of the aperture stop are not blocked by the secondary mirror for the on-axis field case. FIG. 6 illustrates that the annular aperture of the aperture stop as viewed by an on-axis point on the detector is filled with light and not vignetted by any other surface. FIGS. 7 and 8 illustrate off-axis rays generated through an on-axis four mirror anastigmat telescope design. In FIG. 7, it is seen that the rays (light) which fill the annular aperture of the aperture stop for the furthest off-axis field point are not blocked by the secondary mirror. FIG. 8 illustrates that the annular aperture of the aperture stop as viewed by the off-axis point on the detector is filled with light and not vignetted by any other surface.

Figure 9:
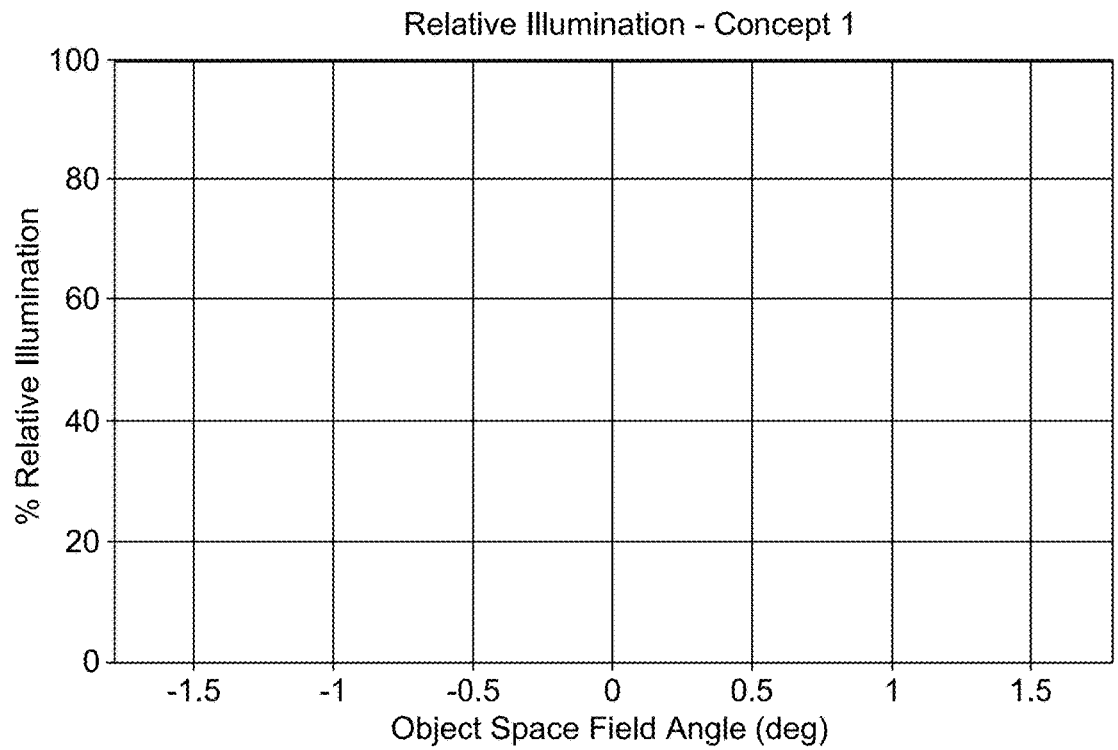
FIG. 9 is a graph showing relative illumination versus object space field angle.

Referring to FIG. 9, the relative illumination of the on-axis four mirror anastigmat telescope design of an embodiment of the present disclosure, e.g., telescope 40, shows that there is very little irradiance roll-off across the image plane. In the shown example, nearly 100% relative illumination is achieved (F/2.65 (effective radiometric)) over the field of view.

Figure 10:
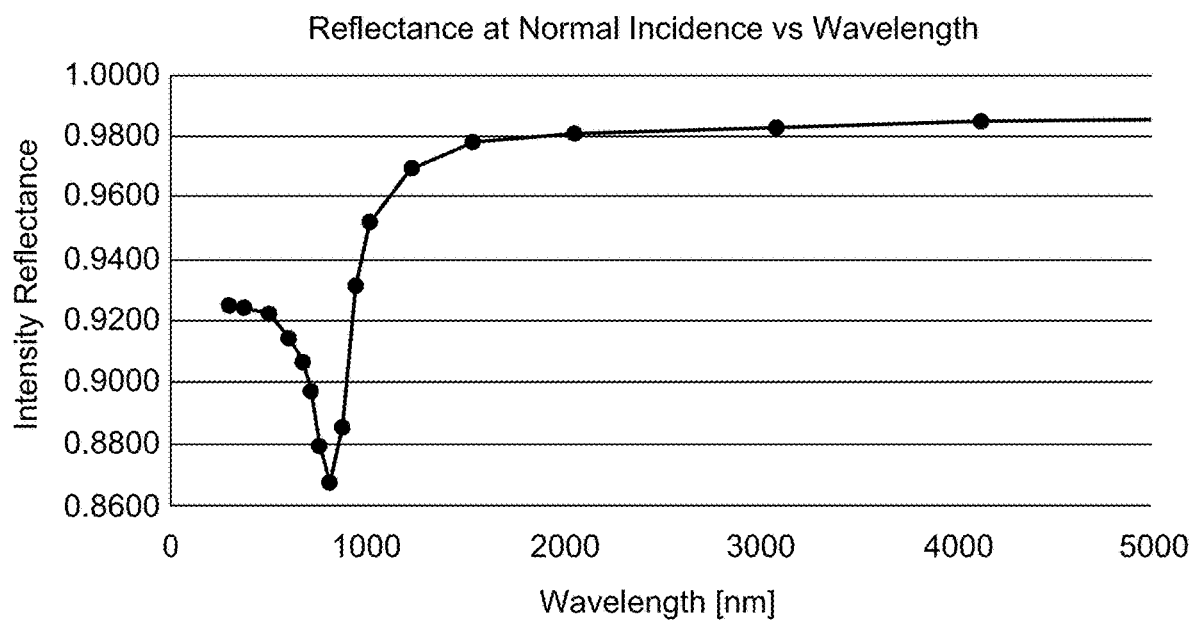
FIG. 10 is a graph showing intensity reflectance versus wavelength for bare aluminum.

Referring to FIG. 10, the reflectance of a bare aluminum mirror surface is plotted. The mirror absorption is highest near 825 nanometer (nm).

Figures 11, 12:
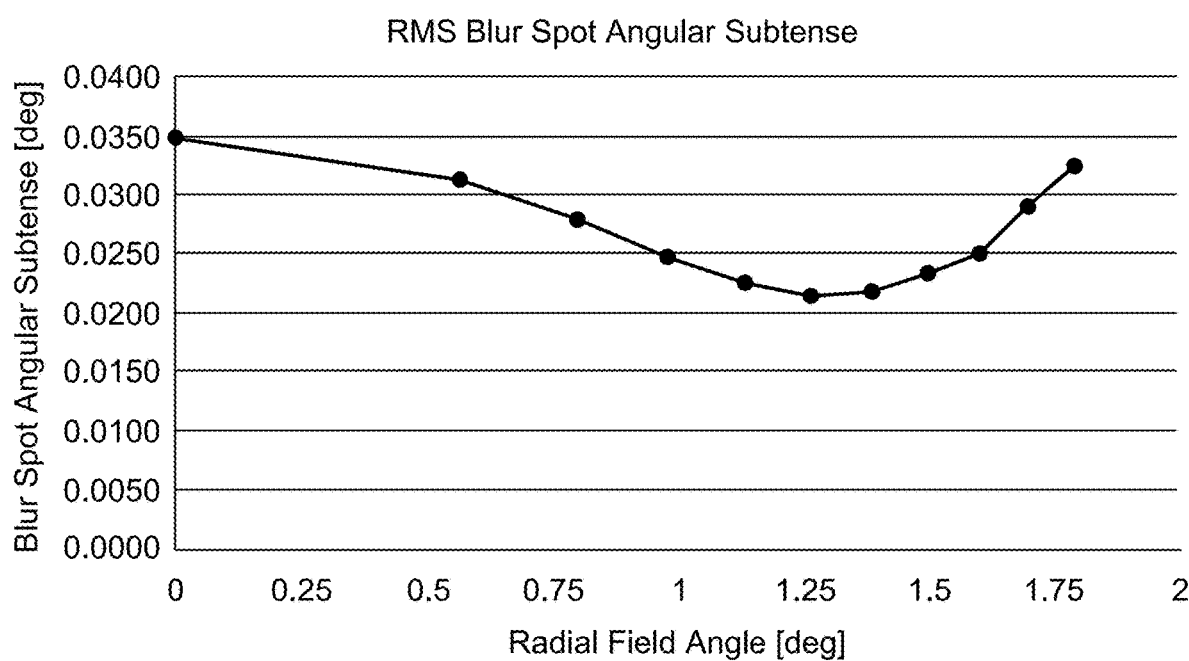
FIG. 11 provides an estimate of the Mueller matrices of the optical design for an on-axis point A, and an extreme off-axis point B for bare aluminum coated mirrors and at 825 nanometer (nm) wavelength.
FIG. 12 is a graph showing blur spot angular subtense versus radial field angle.

Referring to FIG. 11, Mueller matrices are provided, which indicated the polarimetric response of the reflective surfaces coated with bare aluminum and evaluated for 825 nm wavelength light of the on-axis four mirror anastigmat telescope of embodiments of the present disclosure has low polarization sensitivity since the diagonal values highlighted in FIG. 11 are nearly all equal and the off-diagonal values are small.

Figure 13:
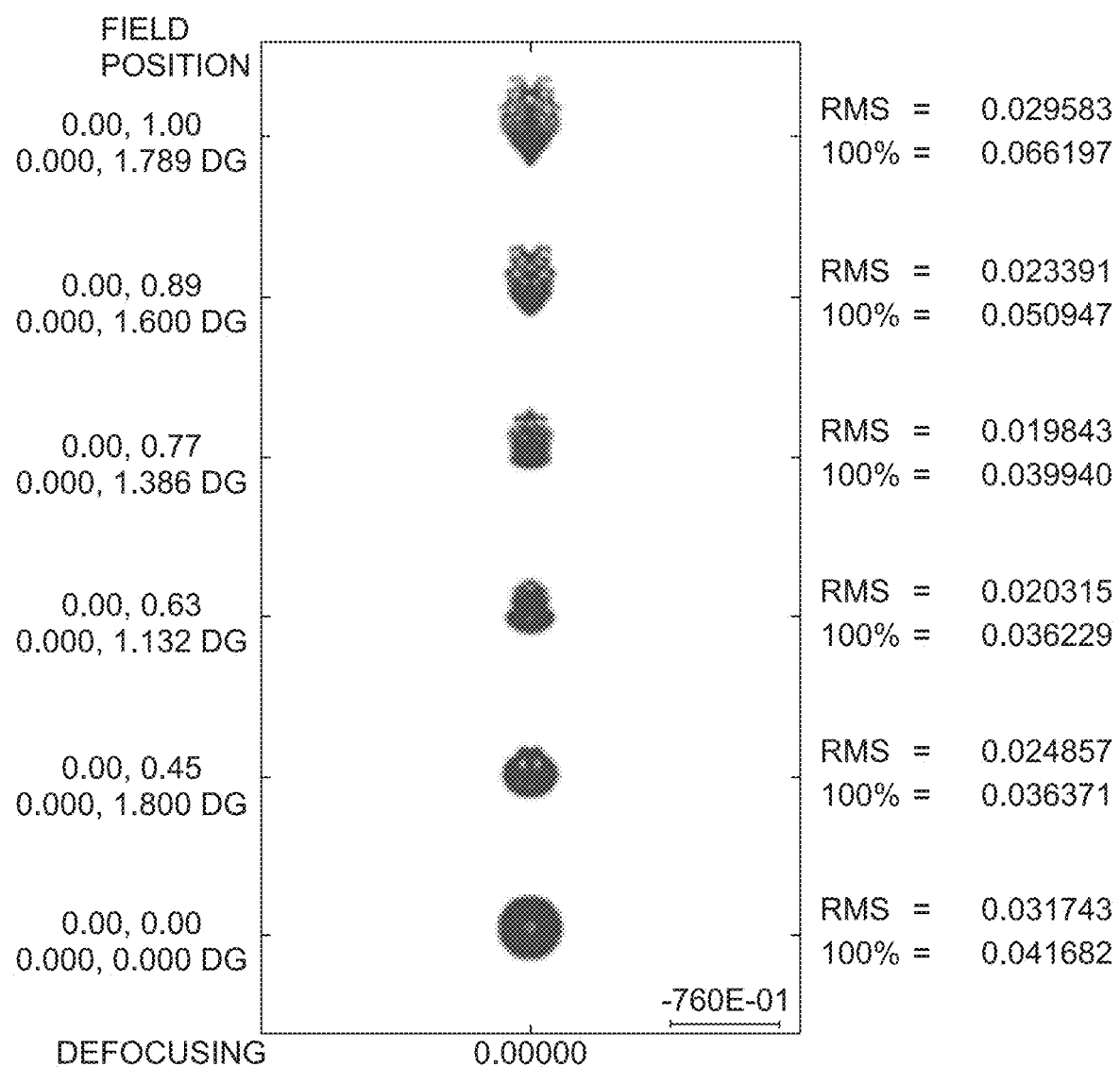
FIG. 13 is a graph showing RMS blur spot on a detector plane.

Referring to FIG. 12, an angular resolution of the on-axis four mirror anastigmat telescope, e.g., telescope 70, shown and described with reference to FIG. 4 are illustrated. FIG. 13 illustrates blur spots on the detector plane.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An on-axis four mirror anastigmat telescope comprising:
  an entrance pupil configured to receive light from an image;
  a mirror assembly having
    a first reflective surface having a first central aperture formed therein,
    a second reflective surface,
    a third reflective surface,
    a fourth reflective surface having a second central aperture formed therein, and
    an aperture stop positioned adjacent to the third reflective surface, the aperture stop being separate from the third reflective surface,
    the mirror assembly being configured to receive light from the image on a common axis and to reflect the light successively by the four coaxial reflective surfaces through the aperture stop; and
  a detector configured to receive light from the mirror assembly, wherein the first central aperture formed in the first reflective surface defines a field stop to limit a field of view, and wherein a central obscuration of the third reflective surface is greater than a central obscuration of the second reflective surface to enhance stray light suppression.

2. The telescope of claim 1, wherein the first reflective surface and the fourth reflective surface are concave annular surfaces, which are arranged back-to-back on the common axis.

3. The telescope of claim 2, wherein the first reflective surface and the fourth reflective surface are formed on opposite faces of a common element.

4. The telescope of claim 3, wherein the first central aperture of the first reflective surface and the second central aperture of the fourth reflective surface are formed by a physical opening in the common element.

5. The telescope of claim 2, wherein the second reflective surface and the third reflective surface are convex surfaces arranged in coaxial relation facing respective concave annular surfaces.

6. The telescope of claim 1, wherein the entrance pupil is located at an image of the aperture stop, and has an aperture slightly larger than the image of the aperture stop.

7. The telescope of claim 6, wherein the entrance pupil embodies a Lyot stop.

8. The telescope of claim 1, further comprising a filter positioned between the mirror assembly and the detector.

9. A method of reflecting light within a telescope configured to reduce stray light, the telescope having an entrance pupil, a first reflective surface, a second reflective surface, a third reflective surface, a fourth reflective surface, a first central aperture formed in the first reflective surface, and a second central aperture formed in the fourth reflective surface, the method comprising:

directing light from the entrance pupil to the first reflective surface;

reflecting light off of the first reflective surface to the second reflective surface;

reflecting light off of the second reflective surface through the first central aperture provided in the first reflective surface and the second central aperture provided in the fourth reflective surface to the third reflective surface; and reflecting light off of the third reflective surface to the fourth reflective surface to a detector, wherein the first central aperture provided in the first reflective surface defines a field stop to limit a field of view, and wherein an aperture stop is positioned adjacent to the third reflective surface, the aperture stop being separate from the third reflective surface, and wherein a central obscuration of the third reflective surface is greater than a central obscuration of the second reflective surface to enhance stray light suppression.

10. The method of claim 9, wherein the light passes through a filter prior to reaching the detector.

11. The method of claim 9, wherein the first reflective surface, the second reflective surface, the third reflective surface and the fourth reflective surface are configured to receive light from an image on a common axis and to reflect the light through llanll the aperture stop.

* * * * *